United States Patent Office 2,987,524
Patented June 6, 1961

2,987,524
PROCESS FOR PREPARING CYCLIC
UNSATURATED ACETALS
Rudolph F. Fischer, Oakland, and Curtis W. Smith, Berkeley, Calif., assignors to Shell Oil Company, a corporation of Delaware
No Drawing. Original application Aug. 8, 1955, Ser. No. 527,156, now Patent No. 2,888,492, dated May 26, 1959. Divided and this application Mar. 27, 1959, Ser. No. 802,287
7 Claims. (Cl. 260—340.7)

This invention relates to the manufacture of cyclic acetals from aldehydes. More specifically, it deals with a novel process for preparing cyclic acetals from selected aldehydes and polyols under specified conditions. New and more efficient methods for producing cyclic acetals which are advantageous starting materials for polyhydroxy alcohols are also the subject of this invention.

Cyclic acetals have been used as sources of polyols in the past. The methods which have been employed have been satisfactory for the regeneration of the polyol corresponding to the starting cyclic acetal, particularly the diols from which the cyclic acetals were derived. They have not been suitable for the production of polyols having a structure corresponding to that of the aldehyde component of the acetal as above indicated. Thus, for example, Groll Patent U.S. 2,122,813 describes and claims the hydrolysis of cyclic acetals to produce the polyol and aldehyde corresponding to the acetal used in the reaction. Reduction of cyclic acetals has also been carried out. Hearne U.S. Patent 2,486,024 points out that the products to be expected in such reductions are either hydroxy ethers or compounds containing the dioxolane ring of the starting cyclic acetal. Hydrogenation of a hemiacetal to produce hydroxy products has been described in French Patent 1,030,806, but this method cannot be used to obtain such products from the full acetals of hydroxyaldehydes with which the present invention is concerned.

Our copending patent application Serial No. 527,156, filed August 8, 1955, now U.S. Patent 2,888,492, patented on May 26, 1959, and of which this application is a division, deals with a process for preparing novel polyols by fissioning the carbon-to-oxygen bonds of certain acetals in such a way that each of the three carbon atoms involved in such linkages is converted to a carbinol group. It is an object of this invention to provide a process for preparing such acetals. Another object is the provision of novel cyclic acetals produced by this process. The acetals here referred to are full acetals, i.e., have only hydrogen and/or saturated carbon atoms linked to the three carbon atoms attached to the two acetal oxygen atoms, that is, to the free bonds of the

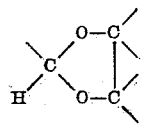

group. They are thus distinguished from hemiacetals which are characterized by the presence of a

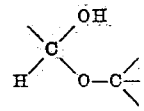

group.

The invention is characterized by a new method for producing cyclic acetals which are useful starting materials for the preparation of the carbinols, as set forth in our noted copending patent application. These new cyclic acetals have special advantages over other cyclic acetals since they can be employed in a novel combination of cooperating steps whereby unsaturated aldehydes can be converted to polyols by use of the present invention.

The cyclic acetals of the invention are prepared by reacting an alpha,beta-ethylenic aldehyde with a polyol having two carbinol groups separated by not more than one carbon atom, in the presence of a catalytic amount of a sulfo acid, at a temperature of about 60° to 100° C. for not more than three hours, while removing the water formed in the reaction.

The sulfo acids used include such acids as sulfuric acid, the toluenesulfonic acids including p-toluenesulfonic acid, ethanesulfonic acid, and the like. These acids are employed in concentrations preferably in the range of 0.02 to 0.06 mole of acid per mole of ethylenic aldehyde present.

The reaction can be carried out conveniently by heating a mixture of the chosen alpha,beta-ethylenic aldehyde and polyol, preferably containing about 5 to 50% excess of aldehyde over the stoichiometric requirement for the reaction, dissolved or suspended in a suitable liquid such as, for instance, benzene, dichloroethylene, etc. By refluxing at about 50° to 90° C. under a phase-separating head until the theoretical amount of water is removed, the reaction is completed in about 1 to 3 hours and high yields of unsaturated cyclic acetals are obtained.

It is important in this new method of producing cyclic unsaturated acetals to use sulfo acid catalysts in the indicated proportions. When less than 0.02 mole of acid per mole of ethylenic aldehyde is used, the reaction time must be prolonged and plant capacity is correspondingly reduced with consequent increased operating cost. If more than 0.06 mole of acid per mole of ethylenic aldehyde is used, the yield of unsaturated acetal is reduced as a result of addition of hydroxyl to the ethylenic double bond.

Most advantageously an alpha,beta- and/or alpha,gamma-polyol having at least one tertiary carbinol group separated by not more than one carbon atom from a secondary or tertiary carbinol group, is used in preparing the cyclic acetal. By the use of this special type of highly substituted polyol it has been unexpectedly found that, in contrast to other polyols and all monohydric alcohols, the reaction with aldehydes goes to completion in the presence of large amounts of water. This makes it possible to employ dilute aqueous solutions of unsaturated aldehydes in the first step of the combination process with considerable saving in operating expense. Thus, by simply adding a highly substituted glycol, such as, for example, 2-methyl-2,3-butanediol, 2,4-dimethyl-2,4-pentanediol, or the like, together with the acid catalyst to an aqueous solution of an aldehyde and heating at about 50°–90° C. one can obtain high yields of acetal without having to distill large amounts of water. This is of special advantage in the treatment of aldehydes which tend to decompose and/or polymerize or condense during recovery from water. Thus, it is particularly useful in preparing cyclic acetals of the unstable alpha- or beta-hydroxyaldehydes or of highly polymerizable alpha-methylidene alkanals.

This process is not only useful in preparing cyclic acetals useful as intermediates in the synthesis of polyols, but it may also be advantageously carried out for other purposes. For instance, it has been found to be highly advantageous for the removal of water-soluble aldehydes from aqueous solutions and has been successfully used for removing aldehydic impurities from other compounds.

The following examples further illustrate specific embodiments of this invention.

Example I 2-methyl-2,4-pentanediol was thoroughly mixed with 10% excess of acrolein, one to three volumes of benzene and 0.026 mole of p-toluenesulfonic acid per mole of acrolein. The mixture was then refluxed vigorously under a phase-separating head for 2.5 hours at which time evolution of water had ceased. After the excess of acrolein and some benzene had been removed by atmospheric distillation through the head, the residue was cooled, and an excess of calcium oxide was stirred into the solution. After filtration the liquid was stripped and distilled at reduced pressure. The product, 2-vinyl-4,4,6-trimethyl-1,3-dioxane, B.P. 62–64° C. at 18 mm., n 20/D 1.4381, was recovered in 98.5% yield and conversion based on the 2-methyl-2,4-pentanediol applied.

| Analysis | C | H | Bromine No. |
|---|---|---|---|
| Calculated | 69.3 | 10.2 | 102 eq./100 g. |
| Found | 69.1 | 10.3 | 100 eq./100 g. |

Example II

Similar reaction of acrolein with 1,2,6-hexanetriol instead of 2-methyl-2,4-pentanediol gives 2-vinyl-4-(omega-hydroxybutyl)-1,3-dioxolane in high yield.

Example III

This experiment was performed to demonstrate the separation of aldehydes from ketones by acetal formation.

A 500-ml. three-necked flask equipped with stirrer and phase-separating head was charged with 58 grams (1.04 moles) of acrolein, 58 grams (1.0 mole) of acetone, 114 grams (0.965 mole) of hexylene glycol, 2-methyl-2,4-pentanediol, 0.1 gram of p-toluenesulfonic acid, and 250 ml. of benzene. After 1.5 hours under reflux, 18.5 ml. of water was removed. A further 1.5 hours gave only 0.5 ml. of water. The solution was then stirred with 2 grams of calcium carbonate, filtered, and stripped. Bromine-water thiosulfate titration of the combined light ends showed a maximum of 4.5 grams of acrolein.

The product was distilled through a two-foot helices-packed column. After a small (3 ml.) forecut the product distilled in the range 65°–67° C. (20 mm.), n 20/D 1.4373. The corresponding constants for the acrolein-hexylene glycol acetal are 62°–64° C. (18 mm.), n 20/D 1.4381. The yield was 128 grams (85% conversion to product on hexylene glycol), and there was 12 grams of bottoms.

In addition to the specific ethylenic aldehydes mentioned in the examples as suitable starting materials for the combination process of the invention, other aliphatic and cycloaliphatic ethylenically unsaturated aldehydes can be used in the process in an analogous manner. Specific examples of such ethylenic aldehydes include tiglic aldehyde, beta-methyl crotonaldehyde, alpha-ethylacrolein, alpha,beta-dimethyl crotonaldehyde, 2-hexenal, citronellal, citral, alpha-chloroacrolein, tetrahydrobenzaldehydes, and alpha-cyclocitral, as well as aromatic aldehydes such as cinnamyl aldehyde. The preferred starting ethylenically unsaturated aldehydes are those having 3 to 12 carbon atoms per molecule which have an ethylenically unsaturated carbon atom not more than once removed from the carbonyl carbon atom and are free from reactive groups other than the ethylenic double bond and the carbonyl group.

As previously indicated, there are special advantages in using alpha,beta- and alpha,gamma-polyols for reaction with these ethylenically unsaturated aldehydes according to the invention. Specific polyols which are useful for this reaction include, in addition to those of the examples, 2,3-butanediol, 2-methyl-2,3-butanediol, pinacol, 2,4-dimethyl-2,4-butanediol, 3-methyl-5-ethyl-3,5-heptanediol, glycerol, 1,2,6-hexanetriol, sorbitol, glycerol monochlorohydrin, alpha-phenyl glycerol, 1,2-dihydroxycyclohexane, and 1-hydroxyhexahydrobenzyl alcohol. The preferred polyols are those having two carbinol groups which are separated by not more than one carbon atom and contain from 2 to 10 carbon atoms per molecule, particularly the compounds of this type having 5 to 10 carbon atoms and at least one tertiary carbinol group separated by not more than one carbon atom from a non-primary carbinol group.

Many of the products obtained in the process are new compounds of the present invention, typical examples being 2-vinyl-4-(delta-hydroxybutyl-1,3-dioxolane, boiling 95°–105° C. at 0.2 mm., n 20/D 1.4641, from acrolein and 1,2,6-hexanetriol, 2-vinyl-4,4,6-trimethyl-1,3-dioxane, boiling 62°–64° C. at 18 mm., n 20/D 1.4381, from acrolein and 2-methyl-2,4-pentanediol, 2-vinyl-1,3-dioxane, boiling 65°–66° C. at 44 mm., n 20/D 1.4438, from acrolein and trimethylene glycol, triallylidene sorbitol, boiling 149°–151° C. at 0.9 mm., n 20/D 1.4865, bromine No. 158, having the structure

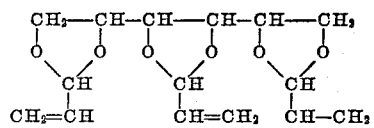

and dicrotonylidene pentaerythritol, boiling 130°–132° C. at 0.5 mm., M.P. 50°–52° C., bromine No. 151. In addition to their use as intermediates in the conversion of acrolein to polyols according to the invention, these new compounds are also advantageous in the preparation of other derivatives. Those having a plurality of vinyl groups in particular form useful resinous materials by copolymerization with other polymerizable ethylenic compounds such as vinyl chloride, butadiene, etc. The mono-ethylenic compounds can be reacted with conjugated di-olefinic compounds such as butadiene to form Diels-Alder adducts or with aldehydes to produce acetals of gamma-ketoaldehydes. Still other useful products can be produced from these new compounds.

It will thus be seen that many apparently widely different embodiments of this invention can be made without departing from the scope and spirit thereof, and it will be understood that the invention is not limited to the specific embodiments which have been given by way of illustration but only as defined in the appended claims.

We claim as our invention:

1. A process for preparing a cyclic unsaturated acetal comprising reacting an alpha,beta-ethylenic monoaldehyde selected from the group of hydrocarbon and chlorinated hydrocarbon monoaldehydes having from 3 to 12 carbon atoms and which are free from reactive constituents other than the ethylenic double bond, the carbonyl group, and the chlorine atom, with a polyol having two carbinol groups separated by not more than one carbon atom, selected from the group consisting of saturated hydrocarbon and chlorinated hydrocarbon polyols, in the presence of 0.02 to 0.06 mole of a sulfo acid per mole of the monoaldehyde at a temperature of 60° to 100° C. for not more than three hours while removing the water formed in the reaction, whereby the cyclic acetal of said ethylenic aldehyde is produced.

2. A method of preparing a cyclic unsaturated acetal of an alpha,beta-ethylenic monoaldehyde selected from the group of hydrocarbon and chlorinated hydrocarbon monoaldehydes having from 3 to 12 carbon atoms and which are free from reactive constituents other than the ethylenic double bond, the carbonyl group, and the chlorine atom, which comprises reacting said aldehyde with a saturated hydrocarbon aliphatic polyol having two carbinol groups separated by not more than one carbon atom, one of which carbinol groups is a tertiary carbinol group and the other of which carbinol groups is directly linked to at least two carbon atoms, in the presence of 0.02 to 0.06 mole of a sulfo acid per mole of said aldehyde present at a temperature of 60° to 100° C. for not more than three hours.

3. A method of producing a 2-vinyl-1,3-dioxolane in accordance with claim 2, which comprises reacting acrolein with a saturated hydrocarbon alpha,beta-diol in the presence of toluenesulfonic acid.

4. A method of producing a 2-vinyl-1,3-dioxane in accordance with claim 2 which comprises reacting acrolein with a saturated hydrocarbon alpha,gamma-diol in the presence of toluenesulfonic acid.

5. A method of producing 2-vinyl-1,3-dioxane which comprises reacting acrolein with 2-methyl-2,4-pentanediol at a temperature of about 60°–100° C. for not more than three hours in the presence of 0.02 to 0.06 mole of a sulfo acid per mole of acrolein while removing the water formed in the reaction.

6. A method for producing 2-vinyl-4-(omega-hydroxybutyl)-1,3-dioxolane, which comprises reacting acrolein with 1,2,6-hexanetriol at a temperature of about 60°–100° C. for not more than three hours in the presence of 0.02 to 0.06 mole of a sulfo acid per mole of acrolein, while removing the water formed in the reaction.

7. The method of claim 6, wherein the sulfo acid is p-toluenesulfonic acid.

References Cited in the file of this patent

UNITED STATES PATENTS

| | | |
|---|---|---|
| 1,934,309 | Hoover | Nov. 7, 1933 |
| 2,131,998 | Billig | Oct. 4, 1938 |

OTHER REFERENCES

Hibbert et al.: "J. Am. Chem. Society," vol. 51, pages 611 to 614 (1929).

Schulz et al.: "Angewandte Chemie," vol. 62, No. 5, page 118 (1950).